United States Patent
Choe (10) Patent No.: US 9,851,889 B2
(45) Date of Patent: Dec. 26, 2017

(54) APPARATUS AND METHOD FOR ROTATING A DISPLAYED IMAGE BY USING MULTI-POINT TOUCH INPUTS

(75) Inventor: Chong-Youn Choe, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 531 days.

(21) Appl. No.: 13/234,719

(22) Filed: Sep. 16, 2011

(65) Prior Publication Data
US 2013/0069987 A1 Mar. 21, 2013

(51) Int. Cl.
*G06T 3/60* (2006.01)
*G06F 3/0488* (2013.01)

(52) U.S. Cl.
CPC .............. *G06F 3/0488* (2013.01); *G06T 3/60* (2013.01); *G06F 2203/04806* (2013.01); *G06F 2203/04808* (2013.01)

(58) Field of Classification Search
CPC ....................................................... G06F 3/017
USPC .................................. 345/650, 173; 715/702
See application file for complete search history.

(56) References Cited

U.S. PATENT DOCUMENTS

| | | | |
|---|---|---|---|
| 2006/0001650 A1* | 1/2006 | Robbins | G06F 3/0421 345/173 |
| 2006/0026521 A1* | 2/2006 | Hotelling et al. | 715/702 |
| 2009/0051946 A1* | 2/2009 | Hibi | H04N 1/3875 358/1.9 |
| 2010/0060588 A1* | 3/2010 | Fong | 345/173 |
| 2011/0102464 A1* | 5/2011 | Godavari | 345/650 |
| 2012/0092357 A1* | 4/2012 | Wang | G06T 11/001 345/581 |
| 2013/0016122 A1* | 1/2013 | Bhatt et al. | 345/620 |
| 2015/0169119 A1* | 6/2015 | Kornmann | G06F 3/04815 345/173 |

FOREIGN PATENT DOCUMENTS

| | | |
|---|---|---|
| JP | 2000-163031 A | 6/2000 |
| KR | 10-2008-0096593 A | 10/2008 |
| KR | 10-2009-0116435 A | 11/2009 |
| WO | 2006/020305 A2 | 2/2006 |

* cited by examiner

*Primary Examiner* — Phi Hoang
(74) *Attorney, Agent, or Firm* — IP Legal Services, LLC (57) ABSTRACT

Apparatus and method for rotating a displayed image by using multi-point touch inputs. In order to rotate an image displayed on a display of a user equipment having a touch input device. A first touch input may be made at a first position of the touch input device. Then, a second touch input may be made at a second position of the touch input device while the first touch input remains at the first position of the touch input device. The second touch input may be advanced from the second position to a third position while the first touch input remains fixed at the first position. After advancing, the displayed image may be rotated based on a change in slope of a virtual line connecting the first touch input and the second touch input as the second touch input advances from the second position to the third position.

18 Claims, 6 Drawing Sheets

APPARATUS AND METHOD FOR ROTATING A DISPLAYED IMAGE BY USING MULTI-POINT TOUCH INPUTS

FIELD OF THE INVENTION

Apparatuses and methods consistent with the present invention relate to a user interface of a user equipment employing a touch input unit, and more particularly, to rotating displayed information based on multi-point touch inputs.

BACKGROUND OF THE INVENTION

A user equipment has been advanced to perform multiple functions such as communicating with others, capturing a still image or a moving image, playback of a music file or a video file, playing a game, and a receiving a broadcasting signal. Lately, such a multifunctional user equipment has been receiving greater attention. Instead of using multiple independent devices, a user prefers to use one multifunctional user equipment.

In order to implement such various functionalities in a single user equipment, many studies have been made for developing various user interfaces in hardware and software for interacting with inputs from users. For example, a user equipment generally includes a touch screen having both an input function and a display function. Such a user equipment employs a touch user interface (UI) for receiving touch inputs from a user and displaying information that a user wants.

However, related art touch user interfaces have not typically been designed for receiving and interacting with multi-point touch inputs. Accordingly, there is a need for improvements in the way of recognizing and interacting with multi-point touch inputs made by a user.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an image displayed on a touch screen may be rotated based on at least two touch inputs.

In accordance with another aspect of the present invention, an image in a graphical user interface (GUI) displayed on a touch screen may be rotated in relation to a rotation distance and/or a rotation angle between two positions of touch inputs made on a touch screen by a user.

In accordance with an embodiment of the present invention, a method for rotating an image displayed on a display of a user equipment having a touch input device, the method may include making a first touch input at a first position of the touch input device, making a second touch input at a second position of the touch input device while the first touch input remains at the first position of the touch input device, advancing the second touch input from the second position to a third position while the first touch input remains fixed at the first position, and rotating the displayed image based on a change in slope of a virtual line connecting the first touch input and the second touch input as the second touch input advances from the second position to the third position.

The displayed image may rotate in a direction of advancement of the second touch input with the first position of the first touch input as a center of rotation.

An angle of rotation of the displayed image may be proportional to a rotational distance of travel of the second touch input when the second touch input advances from the second position to the third position. An angle of rotation of the displayed image may be a constant angle.

When the first touch input may remain fixed at the first position and the second touch input advances from the second position to the third position while maintaining in contact with the touch input device for at least a first time, the displayed image may rotate by an angle formed between the second position and the third position with the first position as a center of rotation.

When the first touch input remains fixed at the first position and the second touch input advances from the second position to the third position while maintaining in contact with the touch input device for at least a first time, the displayed image may rotate by a fixed angular amount in a rotational direction corresponding to a direction of the advancement of the second touch input.

The fixed angular amount may be linearly adjusted based on at least one of an acceleration and a speed of advancement of the second touch input. The displayed image may be a selected portion of a full image displayed on the display of the user equipment, and only the displayed image as the selected portion is rotated in relation to the display.

In accordance with another embodiment of the present invention, a method for rotating an image displayed on a display of a user equipment having a touch input device, the method may include making a first touch input at a first position of the touch input device, making a second touch input at a second position of the touch input device while the first touch input remains at the first position of the touch input device, advancing the first touch input from the first position to a third position and advancing the second touch input from the second position to a fourth position, while maintaining the first and second touch inputs in contact with the touch input device, and rotating the displayed image based on a change in slope of a virtual line connecting the first touch input and the second touch input as the first touch input advances from the first position to the third position and the second touch input advances from the second position to the fourth position.

The method may further include selecting a portion of a full image displayed on the display of the user equipment as the displayed image, based on the first position of the first touch input and the second position of the second touch input. Only the displayed image as the selected portion may rotate in relation to the display.

The selected portion may include a first virtual diagonal having one end at the first position of the first touch input and another end at the second position of the second touch input. The selected portion may also rotate by an angular amount proportional to a difference in slope between the first virtual diagonal and a second virtual diagonal, the second virtual diagonal having one end at the third position of the first touch input and another end at the fourth position of the second touch input.

An area of the selected portion may be expanded or contracted concurrently with rotating the displayed image. An angular amount of rotation of the displayed image may be adjusted based on at least one of an acceleration and a speed of advancement of the first and second touch inputs.

In accordance with still another embodiment of the present invention, an apparatus may rotate an image displayed on a display module of a user equipment. The apparatus may include a touch input unit and a controller. The touch input unit may be configured to receive at least a first touch input and a second touch input. The controller may be configured to initiate a rotation of the displayed image based on a change in slope of a virtual line connecting the first touch input and the second touch input when at least one of the first touch input and the second touch input changes position on the touch input unit while maintaining contact with the touch input unit.

The controller may initiate the displayed image to rotate by an angular amount corresponding to the change in slope of the virtual line connecting the first touch input and the second touch input, when at least one of the first touch input and the second touch input changes position on the touch input unit. The change in slope of the virtual line may be effectuated by the change in position of at least one of the first touch input and the second touch input.

The controller may initiate the displayed image to rotate by a fixed angular amount in a rotation direction corresponding to a direction of an advancement of the second touch input when the first touch input remains fixed at an initial position while the second touch input advances from a first position to a second position of the touch input unit while maintaining contact with the touch input device for at least a first time.

When the first touch input advances from a first position to a second position and the second touch input advances from a third position to a fourth position, the controller may initiate the rotation of the displayed image so as to rotate the displayed image by an angular amount proportional to a difference in slope between a first virtual diagonal and a second virtual diagonal. The first virtual diagonal may have one end at the first position of the first touch input and another end at the third position of the second touch input, and the second virtual diagonal has one end at the second position of the first touch input and another end at the fourth position of the second touch input. The touch input unit may be integrally formed with the display module for displaying the image.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1:
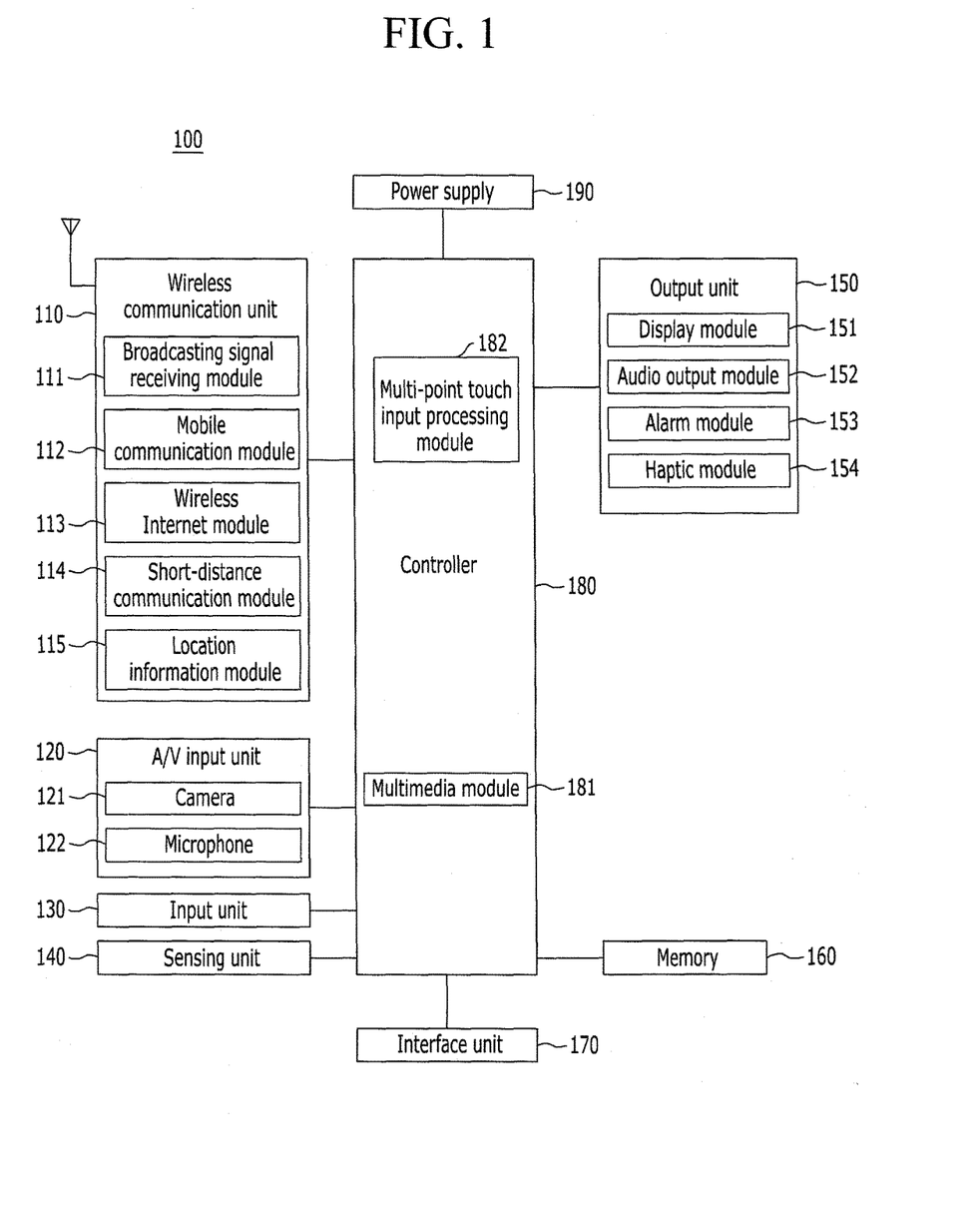
FIG. 1 illustrates a user equipment in accordance with an embodiment of the present invention.
Figure 2:
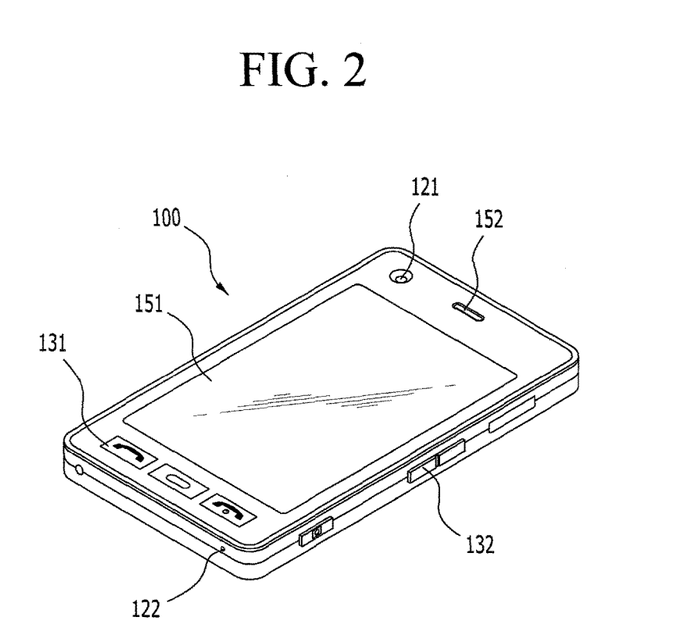
FIG. 2 illustrates an exterior view of a user equipment in accordance with an embodiment of the present invention.

FIG. 1 illustrates a user equipment in accordance with an embodiment of the present invention, and FIG. 2 illustrates an exterior view of a user equipment in accordance with an embodiment of the present invention.

Referring to FIG. 1 and FIG. 2, the user equipment 100 may include a wireless communication unit 110, an audio/video (A/V) input unit 120, an input unit 130, a sensing unit 140, an output unit 150, a memory 160, an interface unit 170, a controller 180, and a power supply 190.

The wireless communication unit 110 may include at least one module for wireless communication between the user equipment 100 and a wireless communication system or between the user equipment 100 and a network in the vicinity of the user equipment 100. For example, the wireless communication unit 110 may include any or all of a broadcasting signal receiving module 111, a mobile communication module 112, a wireless Internet module 113, a short-distance communication module 114, and a location information module 115.

The broadcasting signal receiving module 111 may receive a broadcasting signal and/or broadcasting related information from an external source such as a broadcasting management server through a broadcasting channel. The broadcasting channel may be a satellite channel or a terrestrial channel. The broadcasting management server may be a server that is provided with a broadcasting signal and/or broadcasting related information and may transmit the broadcasting signal and/or broadcasting related information to user equipments. The broadcasting signal may include any or all of a TV broadcasting signal, a radio broadcasting signal, and a data broadcasting signal. The broadcasting related information may be information related to a broadcasting channel, a broadcasting program, or a broadcasting service provider. The broadcasting related information may be provided through a mobile communication network. In accordance with an embodiment of the present invention, the broadcasting related information may be received through the mobile communication module 112. The broadcasting related information may have various types of formats. For example, the broadcasting related information may have a format of an Electronic Program Guide (EPG) of the Digital Multimedia Broadcasting (DMB) or an Electronic Service Guide (ESG) of the Digital Video Broadcast-Handheld (DVB-H).

The broadcasting signal receiving module 111 may receive a broadcasting signal from any of various broadcasting systems. For example, the broadcasting receiving module 111 may use a Digital Multimedia Broadcasting-Terrestrial (DMB-T) system, a Digital Multimedia Broadcasting-Satellite (DMB-S) system, a Media Forward Link Only (Media FLO) system, a Digital Video Broadcast-Handheld (DVB-H) system, and/or an Integrated Services Digital Broadcast-Terrestrial (ISDB-T) system. The broadcasting signal receiving module 111 may be configured to receive a broadcasting signal from other systems as well as from the above described digital broadcasting systems. The broadcasting signal receiving module 111 may store broadcasting signals and/or broadcasting related information in the memory 160.

The mobile communication module 112 may receive a wireless signal from and/or transmit a wireless signal to at least one of base stations, user equipments, and servers in a mobile communication network. The wireless signal may include data in various formats according to a type of the wireless signal, such as a voice call signal, a video call signal, a text message, and a multimedia message.

The wireless Internet module 113 may be a module for wirelessly accessing the Internet. The wireless Internet module 113 may be internally included in the user equipment 100 or externally coupled to the user equipment 100. The wireless Internet module 113 may support various types of technologies for accessing the Internet, such as Wireless Local Area Network (WLAN), Wi-Fi, Wireless broadband (WiBro), World Interoperability for Microwave Access (Wi-MAX), and High Speed Downlink Packet Access (HSDPA), but is not limited thereto.

The short-distance communication module 114 may be a module for a short-distance communication. The short-distance communication module 114 may support related technologies, for example, Bluetooth, Radio Frequency Identification (RFID), Infrared Data Association (IrDA), Ultra Wideband (UWB), ZigBee, and Near Field Communication (NFC), but it not limited thereto.

The location information module 115 may be a module for finding a location of the user equipment 100 and providing information related to the location thereof. The location information module 115 may be a global positioning system (GPS), but is not limited thereto. For example, the location information module 115 may provide three dimensional location data of a location of the user equipment 100, such as latitude, longitude, and altitude of the user equipment 100. Such information may be calculated using various methods. For example, the location information module 115 may calculate distances from three different satellites to the user equipment 100 and times of measuring distances and calculates a location of the user equipment by applying triangulation on the calculated distances and times. For another example, the location information module 115 may calculate location and time information using three satellites and calibrate the location and time information using another satellite. The location information module 115 may constantly calculate a current location of the user equipment 100 in real-time and calculate a speed of the user equipment 100 based on the calculated locations. In accordance with an embodiment of the present invention, the location information module 115 may be used to perform a map searching function.

The A/V input unit 120 may receive an audio signal and/or a video signal. The A/V input unit 120 may include a camera 121 and a microphone 122.

The camera 121 may process image frames of a still image or a moving image, which are captured by an image sensor in a video call mode or a photographing mode. The processed image frame may be displayed on a display module of the user equipment 100 through a display module 151 of the output unit 150. The image frames captured from the camera 121 may be stored in the memory 160 or transmitted to an external device through the wireless communication unit 110. In accordance with an embodiment of the present invention, the user equipment 100 may include a plurality of cameras.

The microphone 122 may receive an audio signal provided externally in an on-call mode, a recording mode, or a voice recognition mode. In the case of the on-call mode, audio data may be converted to a data format that can be transmitted to a mobile communication base station through the mobile communication module 112. The microphone 122 may be implemented with various noise filtering algorithms for eliminating noise generated in the background during the receiving of the external audio signal.

The input unit 130 may be a user interface for receiving input from a user. Such an input unit 130 may be realized as various types. For example, the input unit 130 may include any of a keypad, a touch pad, a jog wheel, and/or a jog switch, but is not limited thereto. The input unit 130 may include at least one operation unit for inputting commands in order to control the operation of the user equipment 100. For example, the input unit 130 may include a call start button 131 and a volume control button 132, as illustrated in FIG. 2. Particularly, user equipments may include a touch screen as a display module in order to satisfy demands of expanding a display screen, making better use of a space, and improving design. When a user equipment employs a touch screen, the input unit 130 may be integrally realized with the display module 151. For example, the input unit 130 may be realized as a soft key type input unit on a display module of the user equipment 100.

The sensing unit 140 may detect a current status of the user equipment 100. For example, the sensing unit 140 may sense an opening or closing of a cover of the user equipment 100, a location and a bearing of the user equipment 100, acceleration and deceleration of the user equipment 100, or physical contact with or proximity to a user. Based on the detected status of the user equipment 100, the sensing unit 140 may generate a sensing signal to control the operation of the user equipment 100. For example, in the case of a mobile phone having a sliding type cover, the sensing unit 140 may sense whether a cover is opened or closed. The sensing unit 140 may sense whether or not the power supply 190 supplies power or whether or not the interface unit 170 is coupled to an external device.

The output unit 150 may generate visual outputs, audio outputs, and/or haptic outputs. The output unit 150 may include a display module 151, an audio output module 152, an alarm module 153, and a haptic module 154.

The display module 151 may output information processed by the user equipment 100. For example, in the case of an on-call mode, the display module 151 may display a user interface (UI) or a graphical user interface (GUI) according to a type of a call. In the case of a video call mode or a photographing mode, the display module 151 may display a UI or a GUI related to received video or display captured image or video. The display module 151 may be a liquid crystal display (LCD), a thin film transistor LCD (TFT LCD), an organic light emitting diode (OLED), a flexible display, or a 3D display but is not limited thereto. In accordance with an embodiment of the present invention, the user equipment 100 may include a plurality of display modules. For example, a plurality of display modules may be disposed on one side of the user equipment 100 with a gap between adjacent display modules or without a gap. Additionally, a plurality of display modules may be disposed on different sides of the user equipment 100.

The user equipment 100 may employ a touch screen as the display module 151. The touch screen may have a layered structure formed of a display module and a touch sensor disposed over or under the display module. Accordingly, the display module 151 may be used not only as an output device but also as an input device when the touch screen is employed as the display module 151. A method for rotating a displayed image in accordance with an embodiment of the present invention will be described based on a user equipment employing a touch screen as a display module.

The touch sensor may be in a form of a touch film, a touch sheet, or a touch pad. The touch sensor may convert pressure applied to a specific part of the display module 151 and capacitance variation formed around a specific part of the display module 151 in accordance with an electric input signal. The touch sensor may detect pressure and/or a directivity of a touch input as well as a location and/or an area of a touch input made on a touch sensor. When the touch sensor senses a touch input, the touch sensor may transmit a corresponding signal to a touch controller. The touch controller may process the signal from the touch sensor and transmit corresponding data to the controller 180. Accordingly, the controller 180 can be aware of which part of a display module has been touched.

A proximity sensor may be disposed in an internal area surrounded by the touch screen or disposed near, around or throughout the touch screen. The proximity sensor is a sensor that may detect an object without a physical contact. For example, the proximity sensor may detect an object approaching a sensing side of the proximity sensor or detect an object located in the vicinity of the proximity sensor using an electromagnetic field or infrared rays. The proximity sensor may have a longer lifespan and higher utilization degree than that of a contact-type sensor. For example, the proximity sensor may be a through-beam photoelectric sensor, a retro-reflective photoelectric sensor, a capacitive proximity sensor, or a magnetic proximity sensor, but is not limited thereto. A capacitive touch screen may be configured to detect an approaching pointer based on electromagnetic variation that may be caused by the pointer approaching the touch screen. Such a capacitive touch screen (touch sensor) may be classified as a type of proximity sensor.

The proximity sensor may sense a proximity touch and/or a proximity touch pattern, for example, a proximity touch distance, a proximity touch direction, a proximity touch speed, a proximity touch time, a proximity touch location, and/or a proximity touch movement state. Information on proximity touch inputs or proximity touch patterns may be displayed on a touch screen.

The audio output module 152 may output audio data stored in the memory 160 or received from the wireless communication unit 110 in an on-call mode, in a recording mode, in a voice recognition mode, and/or in a broadcasting receiving mode. The audio output module 152 may output an audio signal corresponding to functions performed by the user equipment 100. For example, the audio output module 152 may output a call-signal receiving sound or a message receiving sound. Such an audio output module 152 may include a speaker.

The alarm module 153 may output a signal in order to inform a user of event generation in the user equipment 100. For example, the user equipment 100 may generate events such as call signal reception, message reception, key signal input, and/or touch input. The alarm module 153 may output various types of signals such as a video signal, an audio signal, and/or a vibration signal in order to inform a user of the event generation. The video signal and the audio signal may be output through the display module 151 and the audio output module 152 respectively.

The haptic module 154 may generate various types of haptic effects that a user may sense. Particularly, the haptic module 154 may generate vibration. The haptic module 154 may control strength or pattern of vibration. For example, the haptic module 154 may output a vibration effect having different types of vibrations combined together or may output different types of vibrations sequentially. Instead of vibration, the haptic module 154 may generate various types of other effects. For example, the haptic module 154 may generate an effect that stimulates a skin of a user by controlling a pin array with each pin independently moving vertically. The haptic module 154 may generate an effect that stimulates a skin of a user by controlling an air outlet to spray out a burst of air to a user or by controlling an air inlet to intake air from around a user. Furthermore, the haptic module 154 may generate an electrostatic force, a cold sensation, or a warm sensation to stimulate a user.

The haptic module 154 may transfer a haptic effect through direct physical contact or through a muscle sense of a finger or an arm of a user. In accordance with an embodiment of the present invention, the user equipment 100 may include a plurality of haptic modules.

The memory 160 may store programs for operations of the controller 180 and input/output data. For example, the memory 160 may store various data such as contact lists, e-mails, messages, pictures, video files, various vibration patterns and effect sounds in response to a touch input made on the touch screen. In accordance with an embodiment of the present invention, the memory 160 may store programs and data for rotating a displayed image.

The memory 160 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. In accordance with an embodiment of the present invention, the user equipment 100 may interact with a web-based storage that performs the storage function of the memory 160.

The interface unit 170 may include a communication path between the user equipment 100 and an external device or devices coupled to the user equipment 100. The interface unit 170 may receive data or power from an external device, transfer the data to a constituent element of the user equipment 100 or transfer internal data of the user equipment 100 to an external device. For example, the interface unit 170 may include a wired/wireless headset port, an external power charger port, a wired/wireless data port, a memory card port, an identification module connection port, an audio I/O port, a video I/O port, and/or an earphone port. The identification module may be a chip for storing various types of information for authenticating a user right of the user equipment 100. The identification module may include a User Identify Module (UIM), a Subscriber Identity Module (SIM), and/or a Universal Subscriber Identity Module (USIM). A device having the identification module may be manufactured in the form of a smart card. Such a device may be coupled to the user equipment 100 through the identification module connection port.

The interface unit 170 may include a path for receiving power from a cradle or dock when the user equipment 100 is coupled to an external cradle or dock. The interface unit 170 may include a path for transferring command signals input to the cradle or dock by a user to the user equipment 100. A command signal or power input from the cradle or dock may operate as a signal that indicates to a user whether or not the user equipment 100 is accurately or firmly connected to the cradle or dock.

The controller 180 may control an overall operation of the user equipment 100. For example, the controller 180 may control and process a voice call, a text message, and a video call. The controller 180 may include a multimedia module 181 for reproducing multimedia data. The multimedia module 181 may be realized integrally with the controller 180 or independently from the controller 180 as an independent unit. The controller 180 may recognize a touch input made on the touch screen. For example, the controller 180 may process patterns of touch inputs made on the touch screen. Based on the processed patterns, the controller 180 may recognize a character or a symbol input through a touch screen. In accordance with an embodiment of the present invention, the controller 180 may include a multi-point touch input processing module 182 for processing inputs related to a function of rotating an image displayed on the touch screen using multi-point touch inputs.

The multi-point touch input processing module 182 may control a part of an image displayed on the touch screen to be rotated, as specified by a user. The multi-point touch input processing module 182 may control an entire graphical user interface (GUI) displayed on the touch screen to be rotated. The multi-point touch input processing module 182 may control a displayed image to be rotated based on a rotation distance and a rotation direction of one of the multi-point touch inputs made on the touch screen.

The power supply 190 may supply power for operating constituent elements in response to the controller 180. For example, the power supply 190 may receive power from an internal power source or from an external power source.

Figure 3:
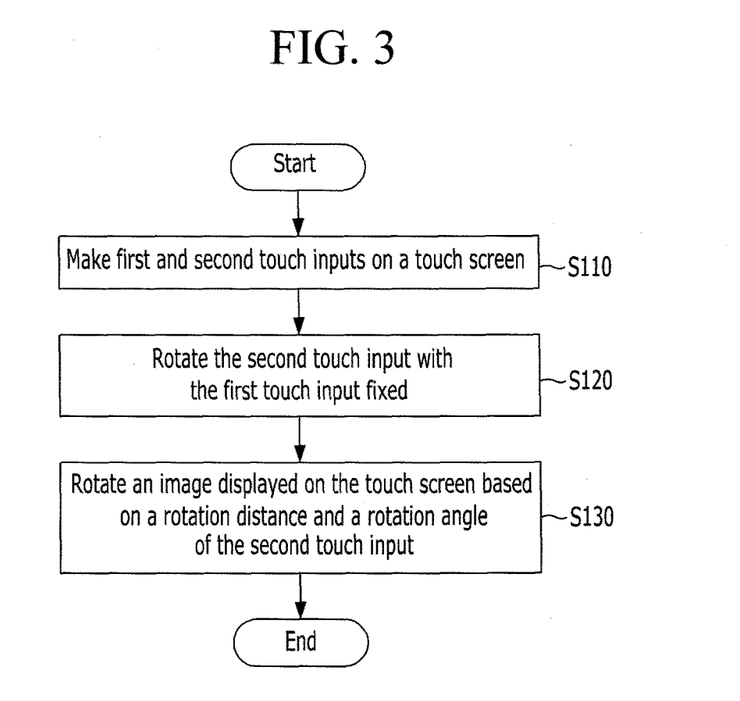
FIG. 3 illustrates a method for rotating an image displayed on a touch screen based on multi-point touch inputs, in accordance with an embodiment of the present invention.

FIG. 3 illustrates a method for rotating an image displayed on a display module based on multi-point touch inputs, in accordance with an embodiment of the present invention. The multi-point touch inputs may represent a gesture command intended for manipulating the size and/or orientation of the image.

Referring to FIG. 3, at least first and second touch inputs may be made on a display module 151 of a user equipment 100 S110. The display module 151 may be a touch screen that displays images. For example, a user may make the first and second touch inputs on the touch screen that displays an image thereon. The image may be an entire graphical user interface (GUI) including a plurality of characters, symbols, and/or icons or one single picture. The second touch input may rotate with the first touch input fixed at an initial position S120. The displayed image on the touch screen 151 may be rotated based on the rotation of the second touch input S130.

For convenience and ease of understanding, the display module 151 has been described as a touch screen integrally formed with a touch input unit, but the present invention is not limited thereto. The touch input unit may be a stand-along device independent from the display device. In this case, the touch input unit may be coupled to the user equipment through a wired link or a wireless link.

Figure 4A:
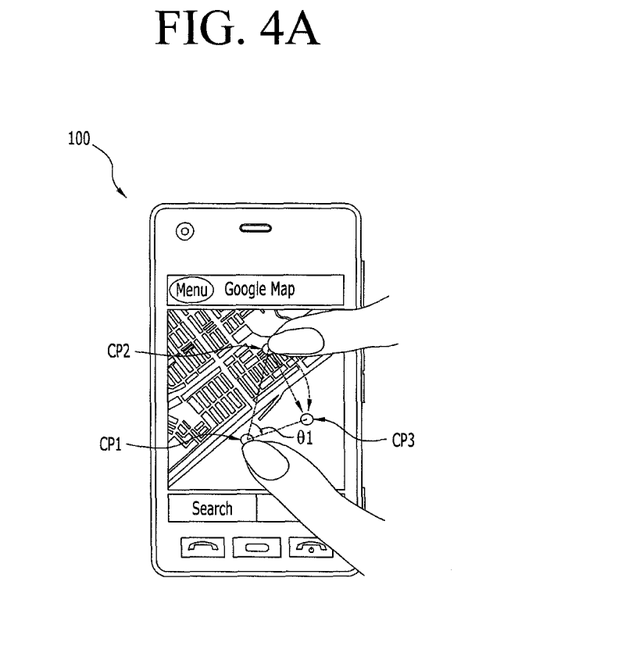
FIGS. 4A and 4B illustrate examples of rotating an image displayed on a touch screen using the method illustrated in FIG. 3, in accordance with an embodiment of the present invention.
Figure 4B:
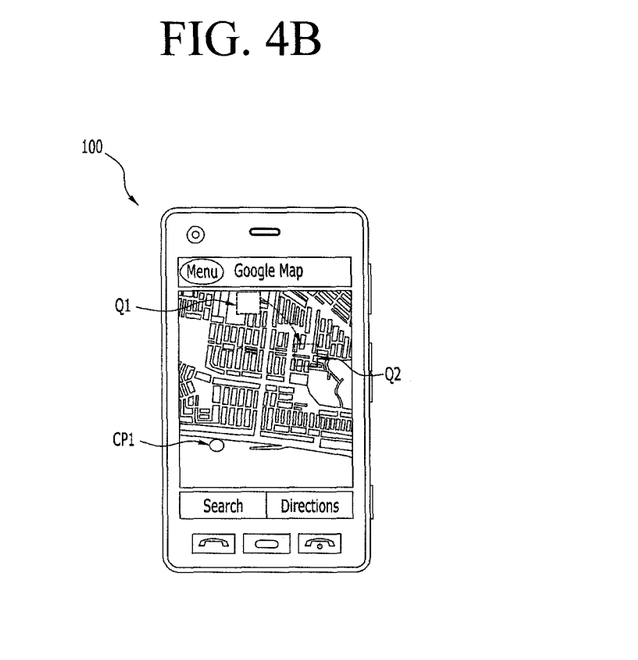

FIGS. 4A and 4B illustrate examples of rotating an image displayed on a display module using the method illustrated in FIG. 3, in accordance with an embodiment of the present invention.

As an example of an image displayed on the display module 151 of the user equipment 100, FIGS. 4A and 4B illustrate a GUI of a Google Map application. Particularly, a map of a specific area may be displayed on the display module 151 of the user equipment 100. Such a map search function may be performed by the location information module 115 of the user equipment 100, as described above. FIGS. 4A and 4B illustrate a user making a first touch input using a thumb and making a second touch input using an index finger on the GUI of the Google map application displayed on the display module 151.

As illustrated in FIG. 4A, a user may make a first touch input at a first position CP1 with a thumb and may make a second touch input at a second position CP2 with an index finger on the GUI displayed on the display module 151. Then, the multi-point touch input processing module 182 of the controller 180 may recognize the first and second touch inputs. The user may make a dragging motion to rotate the index finger from the second position CP2 to a third position CP3 with the thumb fixed at the first position CP1. Accordingly, the GUI displayed on the display module 151 may be rotated in relation to a rotation distance from the second position CP2 to the third position CP3 with the first position CP1 as a center of rotation.

A rotation angle of the displayed GUI may be determined in relation to the rotation distance of the second touch input when the user drags the second touch input from the second position CP2 to the third position CP3 after the second touch input is maintained at the second position CP2 at least for a first duration of time. For example, the rotation angle of the second touch input may be calculated as an angle $\theta 1$ formed between the second position CP2 and the third position CP3 with the first position CP1 as a center of rotation. In this case, the entire displayed GUI rotates at about $\theta 1$ with the first position CP1 as a center of rotation.

A rotation direction of the displayed GUI may be decided as one of a clockwise direction and a counter clockwise direction according to the rotation direction of the second touch input. In FIG. 4A, the displayed GUI rotates in a clockwise direction by an angle of $\theta 1$ in relation to the second touch input rotating from the second position CP2 to the third position CP3. After rotating, an area Q1 located near the second position CP2 may move to an area Q2 located near the third position CP3.

In accordance with an embodiment of the present invention, a user may make a flicking motion in a specific direction to rotate the second touch input. The second touch input may be flicked for a second duration of time and/or by a flicking distance in a specific direction with the first touch input fixed at an initial position such as at the first position CP1. In this case, the displayed image may be rotated by a rotation angle with each flick. The rotation angle may be about 5° but is not limited thereto. For example, a user may quickly flick an index finger in a clockwise direction from the second position CP2 toward the third position CP3 while keeping a thumb at the position CP1. The controller 180 would then rotate the displayed GUI by the rotation angle in the clockwise direction. That is, when a user flicks the second touch input quickly from the second position CP2 towards the third position CP3 with the first touch input fixed at the first position CP1, the displayed GUI rotates by about 5° in a clockwise direction with each flick. Furthermore, the displayed GUI may be rotated based on combination of the dragging motion and the flicking motion of the second touch input.

A rotation angle for rotating a displayed image may be linearly changed in consideration of at least one of strength or speed of rotating the second touch input. For example, the quicker the touch input is made, the further the displayed image may be rotated. Furthermore, the stronger the touch input is made, the further the displayed image may be rotated.

FIGS. 4A and 4B illustrate an entire GUI related to the map search application rotating according to the multi-point touch inputs. The present invention, however, is not limited thereto. In accordance with another embodiment of the present invention, a user may select one of a plurality of items displayed on a display module, and a user may rotate the selected item only by making multi-point touch inputs. In accordance with still another embodiment of the present invention, a user may rotate an entire displayed GUI of one application by an angle such as 90° to thereby change an orientation, by making a second touch input in a direction while a first touch input remains fixed on the displayed GUI of the one application. For example, a user may rotate an input window for an e-mail application to have a vertical orientation or a horizontal orientation by dragging or flicking a second touch input in a vertical direction or a horizontal direction while a first touch input remains fixed on the displayed input window.

As described above, a displayed image may be rotated by rotating, dragging or flicking a second touch input in a direction with a first touch input fixed at an initial position, in accordance with an embodiment of the present invention. However, in accordance with another embodiment of the present invention, a displayed image may be rotated by rotating both a first touch input and a second touch input.

Figure 5:
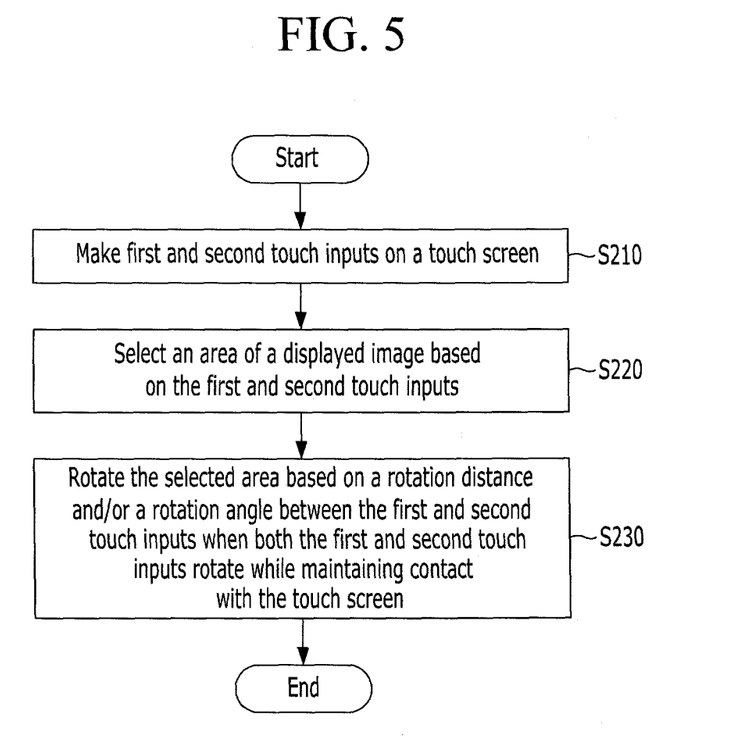
FIG. 5 illustrates a method for rotating an image displayed on a touch screen based on multi-point touch inputs, in accordance with another embodiment of the present invention.
Figure 6A:
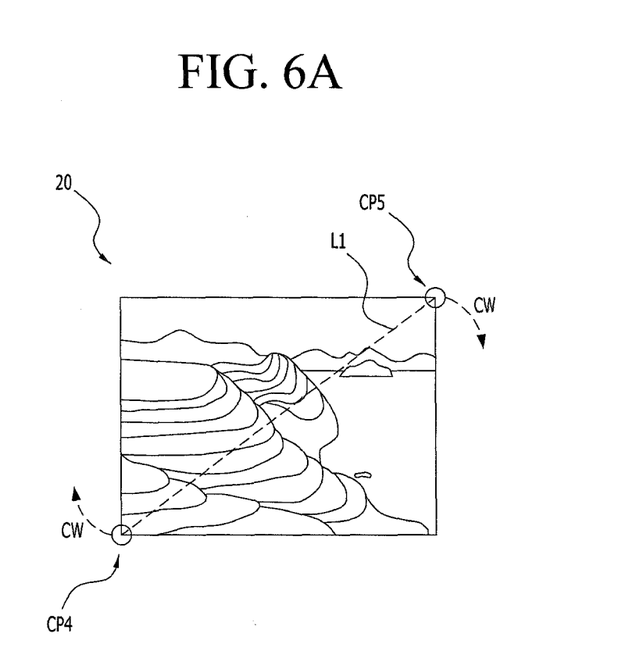
FIGS. 6A and 6B illustrate examples of rotating a displayed image using the method illustrated in FIG. 5, in accordance with an embodiment of the present invention.
Figure 6B:
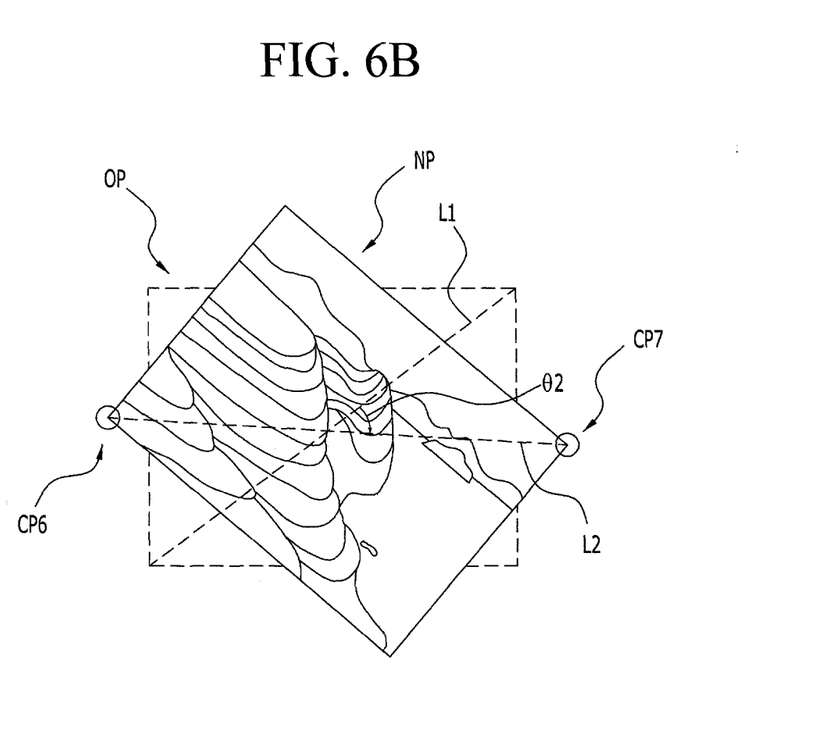

FIG. 5 illustrates a method for rotating an image displayed on a display module based on multi-point touch inputs, in accordance with another embodiment of the present invention. FIGS. 6A and 6B illustrate examples of rotating a displayed image using the method illustrated in FIG. 5, in accordance with an embodiment of the present invention.

Referring to FIG. 5, a user may make at least first and second touch inputs on a display module 151 of the user equipment 100 S210. The display module 151 may be a touch screen and may display images thereon. A specific area of a displayed image or graphic user interface may be selected according to the first and second touch inputs S220. When a user rotates positions of the first and second touch inputs while maintaining contact with the display module 151, the selected area rotates based on a rotating distance and/or a rotating angle of the first and second touch inputs S230.

In accordance with an embodiment of the present invention, an area of a display image may be selected as follows. A user may make a first touch input at a fourth position CP4 and a second touch input at a fifth position CP5 on the display module 151. A rectangular area 20 having a diagonal with ends corresponding to the fourth position CP4 and the fifth position CP5 is selected. Such a method of selecting an area of a display image will be described in more detail with reference to FIGS. 6A and 6B.

As illustrated in FIG. 6A, the first touch input may be made at the fourth position CP4, and the second touch input may be made at the fifth position CP5. A first diagonal L1 may be virtually formed between the fourth position CP4 and the fifth position CP5, and a rectangular area 20 having the first diagonal L1 may be virtually formed. Then, an area included in the rectangular area 20 may be selected. As illustrated in FIG. 6B, the first and second touch inputs may be rotated from the fourth and fifth positions CP4 and CP5 to sixth and seventh positions CP6 and CP7 while maintaining the first and second touch inputs to stay in contact with the display module 151. Accordingly, the selected rectangular area 20 may be rotated from an initial position OP to a new position NP. For example, the rotation angle may be an angle θ2 formed between the first diagonal L1 and a second diagonal L2.

Figure 7:
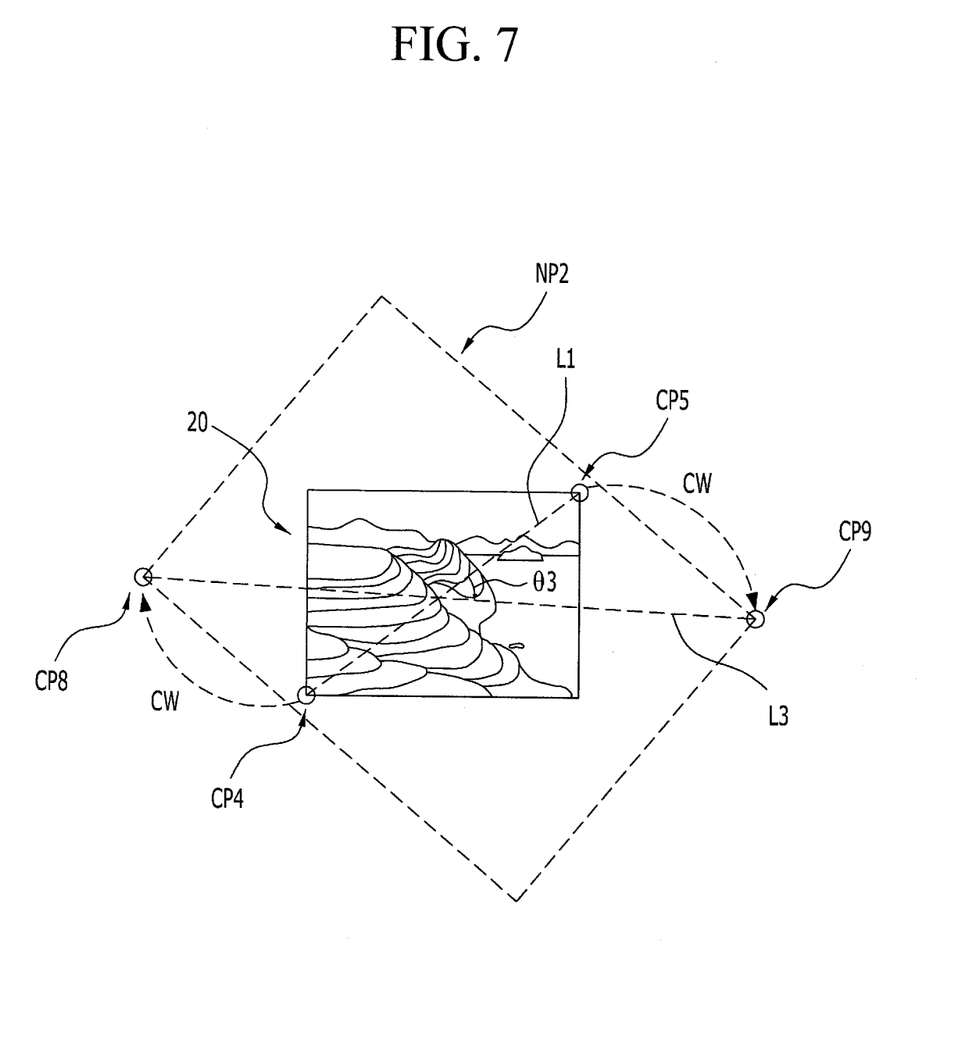
FIG. 7 illustrates another example of rotating a displayed image, in accordance with an embodiment of the present invention.

FIG. 7 illustrates another example of rotating a displayed image, in accordance with an embodiment of the present invention.

In accordance with another embodiment of the present invention, a selected area 20 may be proportionally expanded or reduced while rotating the initial selected area 20, as illustrated in FIG. 7. Referring to FIG. 7, a first touch input may be made at a fourth position CP4, and a second touch input may be made at a fifth position CP5. Then, a first diagonal L1 may be virtually formed between the fourth position CP4 to the fifth position CP5, and a rectangular area 20 having the first diagonal L1 may be selected. When the first and second touch inputs move from the fourth and fifth positions CP4 and CP5 to eighth and ninth positions CP8 and CP9, the selected area 20 may be rotated by an angle corresponding to an angle θ3 formed between the first diagonal L1 and a third diagonal L3 having one end as the eighth position CP8 and the other end as the ninth position CP9. Along with the rotation, the rectangular area 20 may be expanded to a new rectangular area NP2 having the third diagonal L3.

As described above, a displayed image on a touch screen may be rotated in relation to a rotation distance and/or a rotation angle, which may be made by rotating touch inputs on the touch screen, in accordance with an embodiment of the present invention.

In accordance with embodiments of the present invention, the method for rotating an image displayed on a screen may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for rotating an image displayed on a display of a user equipment having a touch input device, the method comprising:
receiving, from a user, a first touch input at a first position of the touch input device;
receiving, from the user, a second touch input at a second position of the touch input device while the first touch input remains at the first position of the touch input device;
selecting an image portion to be rotated from a full image currently displayed on a screen of the display of the user equipment, based on the first and second touch inputs;
detecting advancement of the second touch input from the second position to a third position while the first touch input remains fixed at the first position; and rotating only the selected image portion of the currently displayed full image, based on a change in slope of a virtual line connecting the first touch input and the second touch input as the second touch input advances from the second position to the third position, wherein the selecting includes determining a partial area between the first position of the first touch input and the second position of the second touch input as the image portion to be rotated, wherein a boundary of the partial area is formed to pass through the first position and the second position, and wherein the image portion to be rotated is freely selected by the user within the currently displayed full image without restriction on an area to be selected.

2. The method of claim 1, wherein the selected image portion rotates in a direction of advancement of the second touch input with the first position of the first touch input as a center of rotation.

3. The method of claim 1, wherein an angle of rotation of the selected image portion is proportional to a rotational distance of travel of the second touch input when the second touch input advances from the second position to the third position.

4. The method of claim 1, wherein an angle of rotation of the selected image portion is a constant angle.

5. The method of claim 1, wherein when the first touch input remains fixed at the first position and the second touch input advances from the second position to the third position while maintaining in contact with the touch input device for at least a first time, the selected image portion rotates by an angle formed between the second position and the third position with the first position as a center of rotation.

6. The method of claim 1, wherein when the first touch input remains fixed at the first position and the second touch input advances from the second position to the third position while maintaining in contact with the touch input device for at least a first time, the selected image portion rotates by a fixed angular amount in a rotational direction corresponding to a direction of the advancement of the second touch input.

7. The method of claim 6, wherein the fixed angular amount is linearly adjusted based on at least one of an acceleration and a speed of advancement of the second touch input.

8. The method of claim 1, wherein the selected image portion comprises a rectangular area having a first virtual diagonal formed between one end at the first position of the first touch input and another end at the second position of the second touch input.

9. A method for rotating an image displayed on a display of a user equipment having a touch input device, the method comprising:

receiving, from a user, a first touch input at a first position of the touch input device;

receiving, from the user, a second touch input at a second position of the touch input device while the first touch input remains at the first position of the touch input device;

selecting an image portion to be rotated from a full image currently displayed on a screen of the display of the user equipment, based on the first and second touch inputs;

detecting advancement of the first touch input from the first position to a third position and advancement of the second touch input from the second position to a fourth position, while maintaining the first and second touch inputs in contact with the touch input device; and rotating only the selected image portion of the currently displayed full image, based on a change in slope of a virtual line connecting the first touch input and the second touch input as the first touch input advances from the first position to the third position and the second touch input advances from the second position to the fourth position, wherein the selecting includes determining a partial area between the first position of the first touch input and the second position of the second touch input as the image portion to be rotated, wherein a boundary of the partial area is formed to pass through the first position and the second position, and wherein the image portion to be rotated is freely selected by the user within the currently displayed full image without restriction on an area to be selected.

10. The method of claim 9, wherein the selected image portion comprises a rectangular area having a first virtual diagonal formed between one end at the first position of the first touch input and another end at the second position of the second touch input.

11. The method of claim 10, wherein the selected image portion rotates by an angular amount proportional to a difference in slope between the first virtual diagonal and a second virtual diagonal, the second virtual diagonal having one end at the third position of the first touch input and another end at the fourth position of the second touch input.

12. The method of claim 9, wherein an area of the selected image portion is expanded or contracted concurrently with rotating the displayed image.

13. The method of claim 9, wherein an angular amount of rotation of the selected image portion is adjusted based on at least one of an acceleration and a speed of advancement of the first and second touch inputs.

14. An apparatus for rotating an image displayed on a user equipment, the apparatus comprising:

a touch screen configured to receive at least a first touch input and a second touch input from a user and to display the image; and a controller configured to (i) select an image portion to be rotated from a full image currently displayed on the touch screen, based on the first and second touch inputs, and (ii) initiate a rotation of only the selected image portion of the currently displayed full image, based on a change in slope of a virtual line connecting the first touch input and the second touch input when at least one of the first touch input and the second touch input changes position on the touch screen while maintaining contact with the touch screen, wherein the selection of the image portion includes determining a partial area between an initial position of the first touch input and an initial position of the second touch input as the image portion to be rotated, wherein a boundary of the partial area is formed to pass through the initial positions of the first and second touch inputs, and wherein the image portion to be rotated is freely selected by the user within the currently displayed full image without restriction on an area to be selected.

15. The apparatus of claim 14, wherein the controller initiates the selected image portion to rotate by an angular amount corresponding to the change in slope of the virtual line connecting the first touch input and the second touch input, when at least one of the first touch input and the second touch input changes position on the touch screen, and wherein the change in slope of the virtual line is effectuated by the change in position of at least one of the first touch input and the second touch input.

16. The apparatus of claim 14, wherein the controller initiates the selected image portion to rotate by a fixed angular amount in a rotation direction corresponding to a direction of an advancement of the second touch input when the first touch input remains fixed at the initial position while the second touch input advances from a first position to a second position of the touch screen while maintaining contact with the touch input device for at least a first time.

17. The apparatus of claim 14, wherein:

when the first touch input advances from a first position to a second position and the second touch input advances from a third position to a fourth position, the controller initiates the rotation of the selected image portion so as to rotate the selected image portion by an angular amount proportional to a difference in slope between a first virtual diagonal and a second virtual diagonal; and the first virtual diagonal has one end at the first position of the first touch input and another end at the third position of the second touch input, and the second virtual diagonal has one end at the second position of the first touch input and another end at the fourth position of the second touch input.

18. The apparatus of claim 14, wherein when the first touch input advances from a first position to a second position and the second touch input advances from a third position to a fourth position, the selected image portion comprises a rectangular area having a first virtual diagonal formed between one end at the first position of the first touch input and another end at the third position of the second touch input.

\* \* \* \* \*